Figure 8:
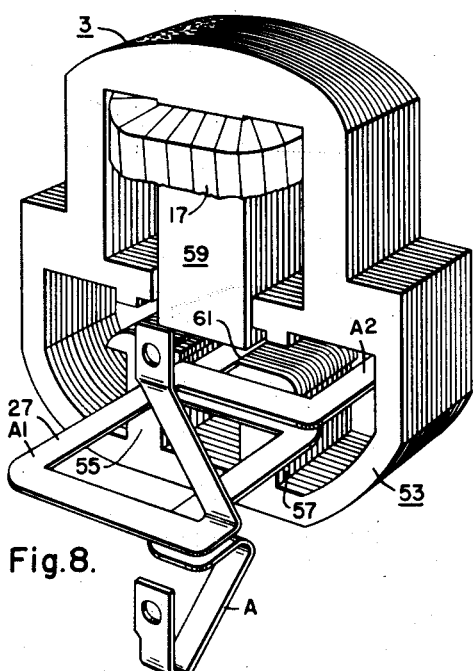

Oct. 20, 1953     B. E. LENEHAN     2,656,512

WATTHOUR METER HAVING PREFORMED CURRENT WINDINGS

Filed Feb. 3, 1950     2 Sheets-Sheet 1

INVENTOR
Bernard E. Lenehan.
BY *C. L. Freedman*
ATTORNEY

Oct. 20, 1953     B. E. LENEHAN     2,656,512
WATTHOUR METER HAVING PREFORMED CURRENT WINDINGS
Filed Feb. 3, 1950     2 Sheets-Sheet 2

INVENTOR
Bernard E. Lenehan.
BY
*C. L. Fredman*
ATTORNEY

Patented Oct. 20, 1953

2,656,512

UNITED STATES PATENT OFFICE 2,656,512

WATTHOUR METER HAVING PREFORMED CURRENT WINDINGS

Bernard E. Lenehan, Bloomfield, N. J., assignor to Westinghouse Electric Corporation, East Pittsburgh, Pa., a corporation of Pennsylvania Application February 3, 1950, Serial No. 142,179

12 Claims. (Cl. 324—137)

This invention relates to electrical devices having windings associated with magnetic structures, and it has particular relation to electrical meters having preformed windings associated with magnetic structures.

Although the invention is suitable for various types of electrical devices employing electromagnets, it is particularly suitable for induction-type alternating-current meters and will be discussed with reference to watt-hour meters.

An induction watt-hour meter has a magnetic structure providing an air gap within which an electro-conductive disk is mounted for rotation. Suitable voltage and current windings are associated with the magnetic structure for establishing, when energized, a shifting magnetic field in the air gap.

In order to provide accurate and permanent air gap dimensions, it is extremely desirable in an induction watt-hour meter to employ a magnetic structure of integral construction. Such integral construction also assures uniform and permanent magnetic properties for the magnetic structure. However, when integral construction of the magnetic structure is employed, it has been the practice to wind the series or current windings of the watt-hour meter by hand. Since these windings employ a large conductor, particularly for meters having high current ratings, the windings cannot be passed through the air gap of the meter and must be threaded through the space available around the current pole pieces. Not only is the winding laborious and tedious but care must be exercised to prevent damage to insulation provided for the conductors.

To facilitate the installation of current windings, the magnetic structure for the watt-hour meter has been divided into two parts, the division being made at a plane passing through the air gap. Although this two-part construction facilitates the application of current windings to the meter, it introduces objectionable sources of variations in air gap dimensions and in magnetic properties of the magnetic structure. These variations are due to the difficulty in maintaining accurate and uniform joints between the parts of the magnetic structure both at the time of manufacture and during the period of use of the meter.

In accordance with the invention, preformed current windings are provided for meters having integral or complete magnetic structures. The preformed current windings have a figure-of-eight configuration which is dimensioned to pass through the air gap or available space of the meter during the installation of the windings on the complete magnetic structure. Preferably, the current windings are constructed of a self-supporting electroconductive strip which may be cut, bent or otherwise formed into the desired shape. The invention further contemplates the provision of adequate insulation for the current windings. The insulation may be a solid within which the windings are embedded or it may be in the form of interlocking insulation spacers.

It is, therefore, an object of the invention to provide preformed current windings for meters having magnetic structures of integral construction.

It is a further object of the invention to provide a preformed figure-of-eight current winding which is constructed of self-supporting electroconductive material.

It is also an object of the invention to provide a preformed current winding having terminal or contact blades integral therewith.

It is a still further object of the invention to provide a watt-hour meter having an integral magnetic structure with preformed self-supporting current windings and suitable insulation for the current windings.

Figure 2:
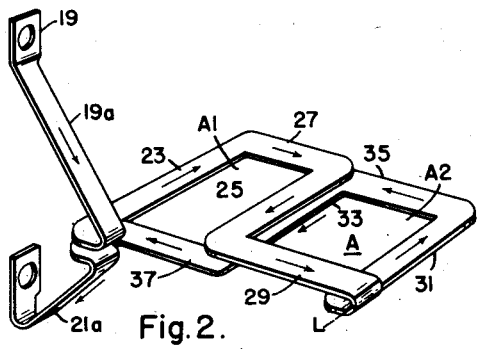
Figure 3:
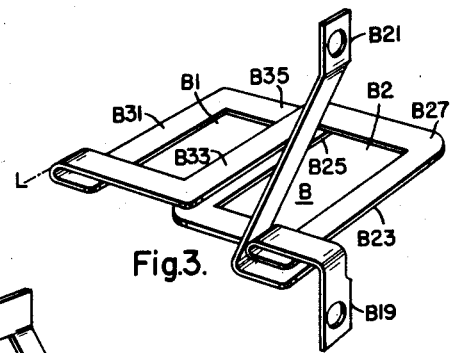
Figure 1:
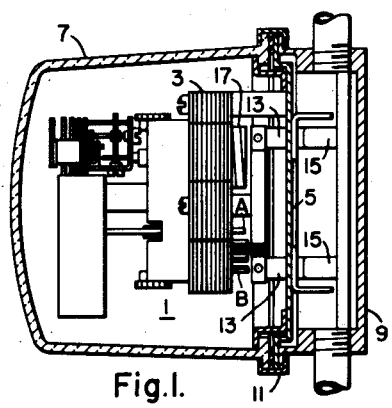
Figure 4:
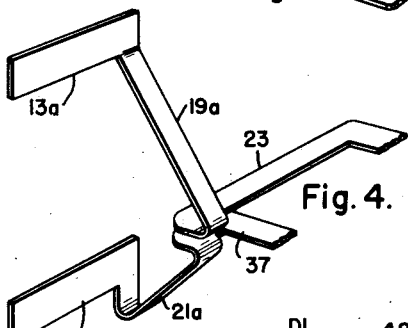
Figure 5:
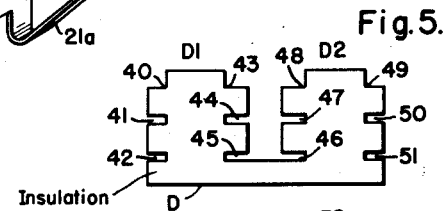
Figure 7:
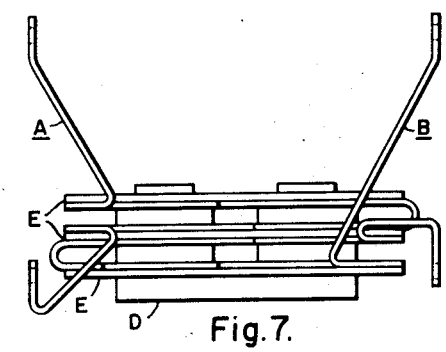
Figure 6:
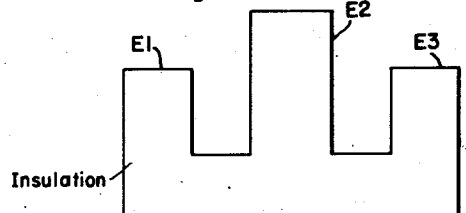
Figure 11:
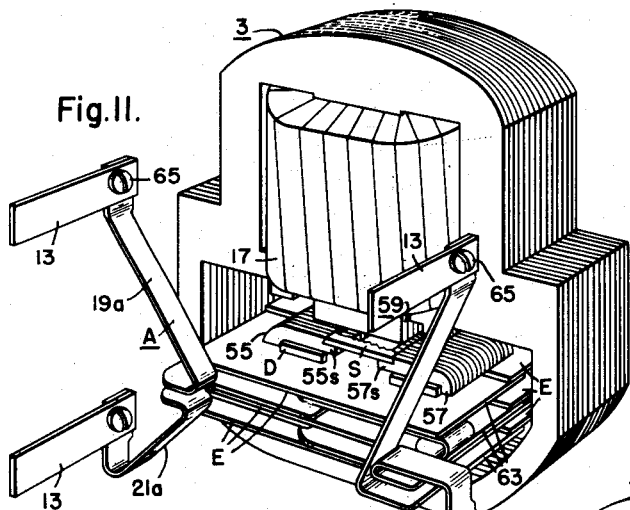
Figure 13:
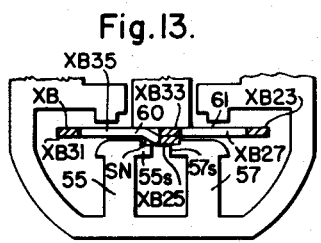
Figure 12:
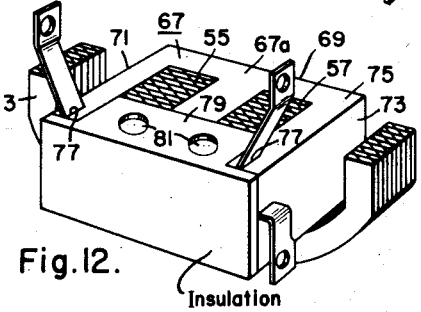

Other objects of the invention will be apparent from the following description taken in conjunction with the accompanying drawings, in which:

Figure 1 is a view in sectional elevation of a watt-hour meter assembly embodying the invention, Figs. 2 and 3 are views in perspective of preformed current windings suitable for the watt-hour meter of Figure 1, Fig. 4 is a view in perspective with parts broken away of a modified preformed current winding embodying the invention, Figs. 5 and 6 are views in plan of insulating members which may be employed in the watt-hour meter of Fig. 1, Fig. 7 is a view in side elevation showing the preformed windings of Figs. 2 and 3 and the insulating members of Figs. 5 and 6 in assembled relationship, Figs. 8 to 11 are views in perspective showing various stages of the application of the preformed current windings and insulation members to the magnetic structure of a watthour meter, Fig. 12 is a view in perspective with parts broken away of a watthour meter magnetic structure having a molding form associated therewith, and Fig. 13 is a view in side elevation with parts broken away showing a modified procedure for installation of a preformed current winding on a magnetic structure of integral construction.

Referring to the drawings, Fig. 1 shows an induction type alternating-current watthour meter 1 having an integral magnetic structure 3 which is secured to a conventional base plate 5. A glass cover 7 of conventional cup-shape may be detachably secured to the base plate 5 in any suitable manner to provide an enclosure for the watthour meter 1. The enclosure in turn is detachably secured to a socket 9 by means of a removable sealing ring 11.

Connections for the watthour meter are established by means of contact or terminal blades 13 which project through the base plate 5 and which are insulated from each other. These contact blades are detachably received in contact jaws 15 which are secured to the socket 9 but which are insulated from each other. The contact blades and contact jaws may be separated merely by the act of withdrawing the watthour meter 1 and its container from the associated socket. The association of a detachable watthour meter with its socket is well understood in the art and is illustrated, for example, in the Bradshaw et al. Patent 1,969,499.

The magnetic structure 3 of the watthour meter has associated therewith a voltage winding 17 which is constructed of a large number of turns of a small diameter conductor. In addition, the magnetic structure has preformed current windings or coils A and B associated therewith. The preformed current windings have substantial cross section for the purpose of permitting the passage therethrough of large magnitudes of electrical current. The windings 17, A and B, are connected for energization through the contact blades 13.

The preformed current winding A is shown in greater detail in Fig. 2. It will be noted that the current winding A is constructed of a strip of electroconductive material such as copper, having two spaced terminals 19 and 21. The strip between the terminals follows a tortuous path to provide substantially a figure-of-eight configuration defining two effective loops A1 and A2. It will be noted that the strip is arranged in two adjacent parallel planes. One of these planes includes portions of the strip represented by the bars 23 and 25 and the links 27 and 29. The remaining plane contains portions of the strip represented by bars 31 and 33 and by links 35 and 37. The bars 25 and 33 are spaced and overlap each other to constitute together the central bar of the figure-of-eight configuration. The ends of the strip are displaced from the aforesaid planes to provide leads 19a and 21a which have their ends shaped to provide the terminals 19 and 21. These terminals are in a plane substantially perpendicular to the plane of the figure-of-eight and are located adjacent one end of the winding.

Current traversing the winding of necessity must follow a figure-of-eight path. Inasmuch as the watthour meter herein discussed is of the alternating-current type, an instantaneous direction of current flow is indicated in Fig. 2 by means of arrows. By tracing these arrows, it will be found that the current flows in the aforesaid figure-of-eight path.

The winding of Fig. 2 may be constructed in various ways. For example, let it be assumed that the link 29 is rotated in a clockwise direction about the line L to bring the various links and bars 23 to 37 substantially into the same plane. Let it be assumed further that the leads 19a and 21a and the terminals 19 and 21 also are bent into the same plane. The resulting structure may readily be punched or cut from sheet copper of proper thickness and then bent into the configuration illustrated in Fig. 2.

Alternatively, the winding of Fig. 2 may be constructed by bending round wire or wire of rectangular cross section in to the shape shown in Fig. 2. If round wire is employed, portions requiring a reduction in one dimension may be flattened as desired. As a specific example of the thickness of strip material suitable for a 15-ampere, 3-wire watthour meter, the windings may be formed from sheet copper having a thickness of .078". As previously pointed out, the winding preferably is constructed of self-supporting material so that it may be handled subsequently without alteration in its shape. The material may have sufficient resiliency to permit temporary relative movements of the parts of the winding during assembly.

The winding B also is a figure-of-eight winding and may be formed assentially by rotating the link 29 of Fig. 2 in a clockwise direction approximately 360° about the line L. The leads 19a and 21a of Fig. 2 also would be reshaped to satisfy the lead requirements of the winding B. The winding B provides two loops B1 and B2. Since the various parts of the winding B essentially are similar to corresponding parts of the winding A, similar reference characters have been employed, except for the addition of the prefix B for the parts shown in Fig. 3.

The terminals 19, 21, B19 and B21 are positioned to have secured thereto by machine screws or other suitable means the contact blades 13 of Fig. 1. Such blades are shown in Fig. 11.

If desired, the contact blades may be formed as integral parts of the strips used for the windings A and B. For example, in Fig. 4, contact blades 13a are integrally associated with the leads 19a and 21a. Except for the integral association of the contact blades 13a with the leads 19a and 21a, the winding of Fig. 4 is exactly the same as that of Fig. 2.

The windings may be insulated from each other in any suitable manner. For example, in Figs. 5 and 6, insulating members D and E are illustrated. The insulating member D is U-shaped and has two legs D1 and D2 which are positioned for reception in the loops A1 and A2 or B1 and B2 (Figs. 2 and 3) of the preformed current windings. To facilitate interlocking of the insulation members D and E, the member D has a plurality of notches 40, 41, 42, 43, 44, 45, 46, 47, 48, 49, 50 and 51 formed therein.

The insulating member E is of E configuration having three legs E1, E2 and E3. These legs are proportioned for reception in the notches provided in the insulating member D. For example, if the leg E2 is inserted in the notches 44 and 47, the legs E1 and E3 will be received, respectively, in the notches 41 and 50.

In Fig. 7, the preformed windings A and B are shown suitably associated with the insulating members D and E. It will be noted that three insulating members E are employed in Fig. 7. The central member E is interposed between the two windings A and B and the legs thereof are received in the notches 41, 44, 47 and 50 of Fig. 5. The lower insulating member E is located below the preformed winding B and the legs of this lowermost insulating member E of Fig. 7 are received in the notches 42, 45, 48 and 51 of Fig. 5. The upper insulating member E of Fig. 7 has legs which are received in the notches 40, 43, 48 and 49 of Fig. 5. It will be understood that a second insulator member D would be located adjacent the opposite side of the windings A and B, and that three additional members E would be inserted from the opposite side to complete the insulation of the windings. The additional insulation is shown in Fig. 11 and will be discussed further below.

In Fig. 8, the magnetic structure 3 is shown in greater detail. It will be noted that the magnetic structure is constructed of laminations of soft magnetic material. The laminations provide a continuous magnetic rim 53 and a pair of parallel current poles 55 and 57 located within the rim. A voltage pole 59 also is located within the rim. The current poles have pole faces which are spaced from the pole face of the voltage pole 59 to provide an air gap 61.

In order to insert the preformed winding A into its operative position, the bar 31 (Fig. 2) is inserted through the air gap 61 (Fig. 8) until the loop A2 is positioned over the current pole 57. The winding then may be dropped over the current pole 57. Next the link 27 is raised into the air gap of the magnetic structure and the entire winding A is rotated in a clockwise direction, as viewed from the voltage pole to pass the link 27 through the air gap. This positions the loop A1 over the current pole 55 and the entire current winding may be dropped over the current poles into operative position. If a source of current is connected to the terminals of the winding A, current passes through the winding in proper direction to produce a current magnetic field in the air gap 61. By this procedure only one thickness of the winding is moved through the air gap at any time, and the overlapping parts may have an over-all thickness larger than that of the air gap.

Although the current winding A alone may be employed for the meter, a three-wire meter will be described employing the additional current winding B.

The current winding B is inserted into operative position in substantially the same manner described with reference to the current winding A. The bar B31 (Fig. 3) of the current winding B is passed through the air gap of the magnetic structure 3 until the loop B1 is positioned above the current pole 55. The winding B now is dropped to surround the current pole 55. Next the link B27 is raised and moved into the air gap and the winding B is rotated in a counterclockwise direction, as viewed from the voltage pole, to pass the link B27 through the air gap. The entire winding B now may be dropped into operative position with the current poles 55 and 57 projecting through the loops B1 and B2, respectively.

Figure 10:
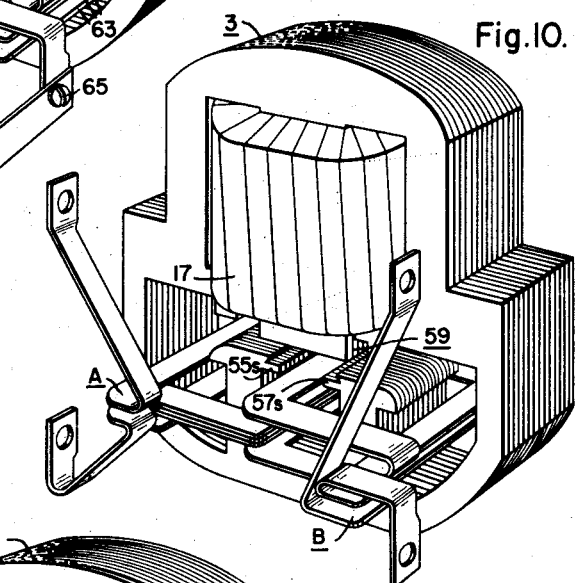
Figure 9:
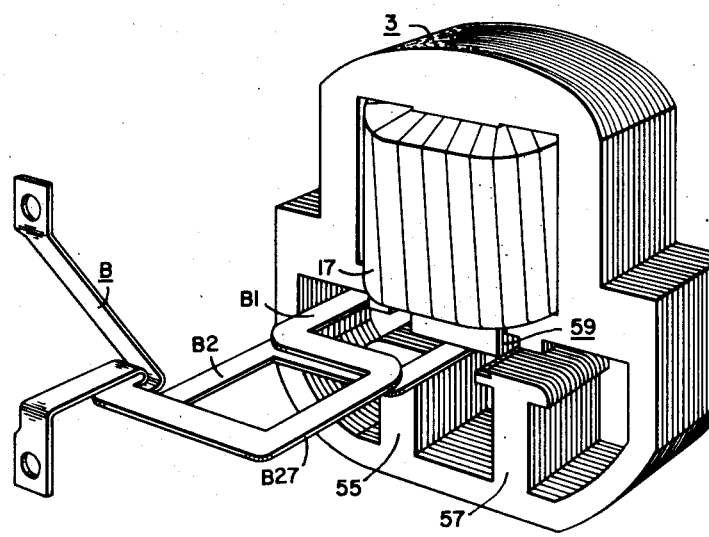

In Fig. 10, the winding B has been inserted in the manner discussed with reference to Fig. 9 and the winding A thereafter has been inserted in the manner discussed with reference to Fig. 8. The two current windings required for a three-wire meter now are installed in operative position.

Inasmuch as only one thickness of the winding is moved through the air gap at any one time, a winding of substantial thickness may be employed.

In Fig. 11, the complete electromagnet for the watthour meter is illustrated. It will be noted that the insulating member D has been applied to the front faces of the current poles. A second insulating member D would be similarly applied to the rear faces of the current poles. Three insulating members E are applied from the front in the manner discussed with reference to Fig. 7 for the purpose of properly spacing and insulating the windings. Also, three additional insulating members E are applied from the rear face in the same manner for the same purpose. It will be noted in Fig. 11 that the legs of the insulating members E applied from the front and rear faces have overlapping portions 63.

In Figs. 8, 9, 10 and 11, the voltage winding 17 which may be preformed is illustrated in broken lines. In assembling the complete electromagnet a few of the magnetic laminations are taken at a time and the tips of the voltage poles of these laminations are displaced sufficiently from the plane of the laminations to permit their passage through the opening in the preformed voltage coil 17. Additional laminations similarly are inserted through the opening in the voltage coil until the proper thickness of the laminations is built up. This procedure for assembling a preformed voltage coil on the electromagnet is well known in the art. The laminations then may be secured to each other in any suitable manner as by means of rivets (not shown).

To complete the electromagnet of Fig. 11, the windings A and B and the associated insulation are applied in the manner previously discussed. It will be seen that all of the windings associated with the electromagnet of Fig. 11 are preformed. At the same time, the electromagnet itself is of integral construction, thus assuring a permanently accurate air gap and assuring permanently uniform magnetic properties.

Finally, a magnetic shunt S may be inserted between the current poles 55 and 57 adjacent the pole faces thereof. Such a shunt is well known in the art and a suitable shunt is shown, for example, in the Barnes Patent 2,162,522. The current poles have ledges 55s and 57s which project towards each other beneath the shunt S. These ledges are spaced to permit passage therebetween of portions of the windings A and B.

In Fig. 11, the contact blades 13 are shown secured to the various leads by means of suitable machine screws 65. As previously pointed out, the contact blades may be formed as integral parts of the various leads.

If desired, the current windings may be embedded in solid insulation. For example, in Fig. 12 a two-part mold form or box 67 is provided for this purpose. The box has a first part 67a which is provided with a wall 69 and sides 71 and 73. The part 67a also has an upper plate 75 of E configuration. The E configuration provides slots for receiving the exposed parts of the current poles 55 and 57. A lower plate similar to the upper plate is provided for the part 67a. The part 67a also has slots 77 for receiving snugly the various leads of the windings.

The box 67 includes a second part or cover 67b. This cover has an upper plate 79 and a similar lower plate which coact with the upper and lower paltes of the part 67a to complete an enclosure for the windings. Openings 81 may be provided through which a suitable insulating material may be inserted in liquid form. After insertion of the liquid insulating material, the insulating material may be hardened or solidified in any suitable manner. For example, polyethylene may be inserted in heated liquid form and allowed to cool and solidify. As a further example of a suitable insulating material natural or synthetic rubbers may be employed. A specific example of a suitable synthetic rubber is butyl rubber. After the insulating material has solidified, the parts of the box may be separated and removed from the electromagnet.

During the molding operation the insulating members D and E maintain the spacing of the windings and are embedded with the windings in the solid insulation. If molding is employed, however, smaller spacing insulating members may be employed to maintain the desired spacing during the molding operation.

An alternative construction for the preformed current winding is illustrated in Fig. 13. A copper winding XB is illustrated which is similar to the winding B of Fig. 3, except that virtually all parts of the figure-of-eight may be disposed in a common plane. In Fig. 13, the parts XB31, XB25, XB33, XB23 and XB27 all correspond to the parts of Fig. 3 which bear the same reference character except for the prefix X. However, it will be noted that the link XB35 in Fig. 13 is bent at 60 in the space between the current poles 55 and 57 to permit virtually all parts of the figure-of-eight, when being inserted through the air gap, to be forced into the same plane, except for the bar XB25. The notches SN provided in the current poles for reception of the shunt S (Fig. 11) provides sufficient room for the bars XB33 and XB25 to be passed through the resultant airgap. Consequently, these bars may be forced together against the resiliency of the copper and the entire winding XB may be forced bodily through the air gap 61 until the loops in the winding XB are positioned over the current poles 55 and 57. The windings XB then may be moved slightly to the left, as viewed in Fig. 13, until the bars XB25 and XB33 are positioned over the passage between the ledges 55s and 57s. Finally the complete winding XB may be dropped into operative position with the current poles received in the two loops provided by the winding. The winding A of Fig. 2 similarly may be modified for insertion in the manner described with reference to Fig. 13.

Although the invention has been described with reference to certain specific embodiments thereof, numerous modifications falling within the spirit and scope of the invention are possible.

I claim as my invention:

1. In an electrical measuring device, a winding for carrying electric current, said winding comprising a self-supporting electroconductive strip having a pair of spaced terminals, the strip between the terminals being deformed to provide a winding of figure-of-eight configuration and including a pair of side bar portions, a pair of spaced overlapping central bar portions, and a plurality of linking bar portions, the linking bar portions being disposed to join the side bar portions and the overlapping central bar portions to define a pair of loop members disposed in substantially parallel spaced planes for directing current flowing between the terminals in a figure-of-eight path, the central bar portions of the strip overlapping in a direction transverse to the pair of parallel planes defined by the pair of loop members.

2. In an electrical measuring device, a winding for carrying electric current, said winding comprising a self-supporting electroconductive strip having a pair of spaced terminals, the strip between the terminals being deformed to provide a winding of figure-of-eight configuration and including a pair of side bar portions, a pair of spaced overlapping central bar portions, and a plurality of linking bar portions, the linking bar portions being disposed to join the side bar portions and the overlapping central bar portions to define a pair of loop members disposed in substantially parallel spaced planes for directing current flowing between the terminals in a figure-of-eight path, one of the overlapping central bar portions and one of the pair of side bar portions lying in a first plane, and the other of the overlapping central bar portions and the other of the pair of side bar portions lying in a second plane, said first plane and said second plane being disposed in substantially parallel relation and being spaced a distance equivalent to the distance between the overlapping central bar portions.

3. In an electrical measuring device, a winding for carrying electric current, said winding comprising a self-supporting electroconductive strip having a pair of spaced terminals; the strip between the terminals being deformed to provide a winding of figure-of-eight configuration and including a pair of side bar portions, a pair of spaced overlapping central bar portions, and a plurality of linking bar portions, the linking bar portions being disposed to join the side bar portions and the overlapping central bar portions to define a pair of loop members disposed in substantially parallel spaced planes for directing current flowing between the terminals in a figure-of-eight path, the terminals being integral with the strip and disposed adjacent one of the pair of side bar portions of the strip to lie in a plane substantially perpendicular to the pair of parallel planes defined by the pair of loop members.

4. An electrical measuring device having a soft magnetic structure, the magnetic structure including a voltage pole piece having a pole face, and first and second spaced parallel current pole pieces having pole faces spaced from the pole face of the voltage pole piece, each of the current pole pieces being provided with a ledge, said pole pieces each having a base portion and a wall portion, said ledge base portions being disposed to project toward one another to define an air gap in the magnetic structure having a first length dimension extending from said ledge base portions to said voltage pole piece face, having a second length dimension extending from said current pole piece faces to said voltage pole piece face, and having a width dimension extending from one of said ledge wall portions to the other of said ledge wall portions, and a magnetic shunt disposed between the pair of current pole pieces to be supported by said pole piece ledges, in combination with a preformed figure-of-eight winding for the pair of current pole pieces constructed of edge-wound self-supporting electroconductive strip, the strip being deformed to provide a pair of side bar portions, a pair of overlapping central bar portions, and a plurality of linking bar portions, the linking bar portions being disposed to join the side bar portions and the overlapping central bar portions to define first and second loop members lying in spaced parallel planes, the pair of overlapping central bar portions having an overall thickness which is greater than said second length dimension of the air gap whereby the insertion of the strip into the air gap in the direction wherein the first and second loop members tend to enter the air gap simultaneously is prevented, portions of the strip other than the overlapping central bar portions having a width which is less than said width dimension of the air gap and having a thickness which is less than said second length dimension of the air gap for permitting insertion of the strip into the air gap prior to the mounting of the magnetic shunt between the current pole pieces in the direction wherein only the first loop member tends to enter the air gap to encircle the first current pole piece to thereby allow the application of the preformed winding to the current pole pieces prior to the mounting of the magnetic shunt between the current pole pieces.

5. An electrical measuring device having a soft magnetic structure, the magnetic structure including a voltage pole piece having a pole face, and first and second spaced parallel current pole pieces having pole faces spaced from the pole face of the voltage pole piece, each of the current pole pieces being provided with a ledge, said pole piece ledges each having a base portion and a wall portion, said ledge base portions being disposed to project toward one another to define an air gap in the magnetic structure having a first length dimension extending from said ledge base portions to said voltage pole piece face, having a second length dimension extending from said current pole piece faces to said voltage pole piece face, and having a width dimension extending from one of said ledge wall portions to the other of said ledge wall portions, and a magnetic shunt disposed between the pair of current pole pieces to be supported by said pole piece ledges, in combination with a preformed figure-of-eight winding for the pair of current pole pieces constructed of edge-wound self-supporting electroconductive strip, the strip being deformed to provide a pair of side bar portions, a pair of overlapping central bar portions, and a plurality of linking bar portions, the linking bar portions being disposed to join the side bar portions and the overlapping central bar portions to define first and second loop members lying in spaced parallel planes, the overlapping central bar portions of the strip having an overall thickness which is less than said first length dimension of the air gap and the current pole pieces being spaced a distance sufficient to thereby permit the strip to be rotated substantially 90° from the position wherein only the first loop member encircles the first current pole piece to the position wherein the second loop member encircles the second current pole piece to thereby allow the preformed winding to be applied to the current pole pieces prior to the mounting of the magnetic shunt between the current pole pieces.

6. The method of applying a winding to a magnetic structure including a voltage pole piece having a pole face, and first and second spaced parallel current pole pieces having pole faces spaced from the pole face of the voltage pole piece, each of the current pole pieces being provided with a ledge, each of said pole piece ledges including a base portion and a wall portion, said ledge base portions being disposed to project toward one another to define an air gap in the magnetic structure having a first length dimension extending from said ledge base portions to said voltage pole piece face, having a second length dimension extending from said current pole piece faces to said voltage pole piece face, and having a width dimension extending from one of said ledge wall portions to the other of said ledge wall portions, said method comprising the steps of deforming a strip of electroconductive material having a width less than said width dimension of the air gap and having a thickness less than said second length dimension of the air gap into a figure-of-eight configuration to provide first and second loop members disposed to be joined by a central bar portion, said deforming operation including the step of positioning two portions of the strip in overlapping relation to provide the central bar portion of the figure-of-eight winding, the central bar portion having an overall thickness less than said first length dimension of the air gap, introducing the first loop member into the air gap, shifting the winding to position the central bar portion thereof in the air gap at the region of said first length dimension and said width dimension, and moving the winding in a direction to position the first and second loop members in encircling relation with the first and second current pole pieces respectively.

7. The method of applying a winding to a magnetic structure including a voltage pole piece having a pole face, and first and second spaced parallel current pole pieces having pole faces spaced from the pole face of the voltage pole piece, each of the current pole pieces being provided with a ledge, each of said pole piece ledges including a base portion and a wall portion, said ledge base portions being disposed to project toward one another to define an air gap in the magnetic structure having a first length dimension extending from said ledge base portions to said voltage pole piece face, having a second length dimension extending from said current pole piece faces to said voltage pole piece face, and having a width dimension extending from one of said ledge wall portions to the other of said ledge wall portions, said method comprising the steps of deforming a strip of electroconductive material having a width less than said width dimension of the air gap and having a thickness less than said second length dimension of the air gap into a figure-of-eight configuration to provide first and second closed loop portions disposed to be joined by a central bar portion, said deforming operation including the step of positioning two portions of the strip in overlapping relation to provide the central bar portion of the figure-of-eight winding, the central bar portion having an overall thickness less than the said first length dimension of the air gap, introducing the winding into the air gap in the direction tending to align the first loop member with the first current pole piece, shifting the winding in a direction to effect the movement of the central bar portion into the air gap at the region of said first length dimension thereof, the current pole pieces being spaced a distance sufficient to permit the shifting of the winding in such direction, continuing the shifting of the winding until the second loop member is moved into alignment with the second current pole piece, and moving the winding in a direction to position the first and second loop members in encircling relation with the first and second current pole pieces respectively.

8. The method of applying a winding to a magnetic structure including a voltage pole piece having a pole face, and first and second spaced parallel current pole pieces having pole faces spaced from the pole face of the voltage pole piece, each of the current pole pieces being provided with a ledge, each of said pole piece ledges including a base portion and a wall portion, said ledge base portions being disposed to project toward one another to define an air gap in the magnetic structure having a first length dimension extending from said ledge base portions to said voltage pole piece face, having a second length dimension extending from said current pole piece faces to said voltage pole piece face, and having a width dimension extending from one of said ledge wall portions to the other of said ledge wall portions, said method comprising the steps of deforming a strip of electroconductive material having a width less than said width dimension of the air gap and having a thickness less than said second length dimension of the air gap into a figure-of-eight configuration to provide first and second closed loop portions disposed to be joined by a central bar portion, said deforming operation including the step of positioning two portions of the strip in overlapping relation to provide the central bar portion of the figure-of-eight winding, the central bar portion having an overall thickness less than said first length dimension of the air gap, introducing the winding into the air gap in the direction tending to align the first loop member with the first current pole piece, positioning portions of the strip leading away from a common end of the central bar portion substantially in the plane of one of the overlapping portions of the strip which constitute the central bar portion of the strip to effect the engagement of such overlapping portions, shifting the winding through an angle of substantially 90° in the direction tending to effect the entrance of the central bar portion into the air gap at the region of said first length dimension thereof, the current pole pieces being spaced a distance sufficient to permit the shifting of the winding in such a direction, continuing the shifting of the winding until the second loop member is moved into alignment with the second current pole piece, and moving the winding in a direction to cause the first and second loop members to encircle the first and second current pole pieces respectively.

9. An electrical measuring device having a magnetic structure defining an air gap having a predetermined minimum first dimension, said magnetic structure including a first pole piece having a first pole face on a first side of said air gap, and a pair of spaced parallel second pole pieces having second pole faces on a second side of the air gap disposed substantially in a common plane parallel to, and spaced from, the first pole face to define said air gap, said second pole pieces having projections extending towards each other to define a passage therebetween having a predetermined minimum second dimension, said projections being spaced from the first pole face by a distance greater than the first dimension, in combination with a figure-of-eight winding for the second pole pieces constructed of edge-wound, self-supporting, electroconductive strip, said strip having a thickness larger than one-half of, but smaller than, the first dimension, said distance being at least twice the thickness of the strip, and the width of the strip being less than the second dimension.

10. An electrical measuring device having a magnetic structure defining an air gap having a predetermined minimum first dimension, said magnetic structure including a first pole piece having a first pole face on a first side of said air gap, and a pair of spaced parallel second pole pieces having second pole faces on a second side of the air gap disposed substantially in a common plane parallel to, and spaced from, the first pole face to define said air gap, said second pole pieces having projections extending towards each other to define a passage therebetween having a predetermined minimum second dimension, said projections being spaced from the first pole face by a distance greater than the first dimension, in combination with a figure-of-eight winding for the second pole pieces constructed of edge-wound, self-supporting, electroconductive strip, said strip having a thickness larger than one-half of, but smaller than, the first dimension, said distance being at least twice the thickness of the strip, the width of the strip being less than the second dimension, said figure-of-eight winding comprising a pair of sections; each of the sections having a central bar portion, a first linking bar portion extending in a first direction from a first end of the central bar portion and a second linking bar portion extending in a direction substantially opposite to the first direction from a second end of the central bar portion; said sections being adjacent each other but reversed relative to each other about a line parallel to the central bar portions with the central bar portions positioned to have a substantially common projection on a plane parallel to the figure-of-eight winding, a side bar portion connecting two ends of the linking bar portions on a first side of the central bar portions, and a pair of separate spaced terminals connected respectively to the ends of the linking bar portions on a second side of the central bar portions.

11. An electrical measuring device having a magnetic structure defining an air gap having a predetermined minimum first dimension, said magnetic structure including a first pole piece having a first pole face on a first side of said air gap, and a pair of spaced parallel second pole pieces having second pole faces on a second side of the air gap disposed substantially in a common plane parallel to, and spaced from, the first pole face to define said air gap, said second pole pieces having projections extending towards each other to define a passage therebetween having a predetermined minimum second dimension, said projections being spaced from the first pole face by a distance greater than the first dimension, in combination with a figure-of-eight winding for the second pole pieces constructed of edge-wound, self-supporting, electroconductive strip, said strip having a thickness larger than one-half of, but smaller than, the first dimension, said distance being at least twice the thickness of the strip, the width of the strip being less than the second dimension, said figure-of-eight winding comprising a pair of sections; each of the sections having a central bar portion, a first linking bar portion extending angularly in a first direction from a first end of the central bar portion and a second linking bar portion extending in a direction substantially opposite to the first direction from a second end of the central bar portion; said sections being adjacent each other but reversed relative to each other about a line parallel to the central bar portions with the central bar portions positioned to have a substantially common projection on a plane parallel to the figure-of-eight winding, a side bar portion connecting two ends of the linking bar portions on a first side of the central bar portions, and a pair of separate spaced terminals connected respectively to the ends of the linking bar portions on a second side of the central bar portions, said spaced terminals and the figure-of-eight winding being substantially on opposite sides of a plane transverse to the central bar portions.

12. An electrical measuring device having a magnetic structure defining an air gap having a predetermined minimum first dimension, said magnetic structure including a first pole piece having a first pole face on a first side of said air gap, and a pair of spaced parallel second pole pieces having second pole faces on a second side of the air gap disposed substantially in a common plane parallel to, and spaced from, the first pole face to define said air gap, said second pole pieces having projections extending towards each other to define a passage therebetween having a predetermined minimum second dimension, said projections being spaced from the first pole face by a distance greater than the first dimension, in combination with a figure-of-eight winding for the second pole pieces constructed of edge-wound, self-supporting, electroconductive strip, said strip having a thickness larger than one-half of, but smaller than, the first dimension, said distance being at least twice the thicknes of the strip, the width of the strip being less than the second dimension, said figure-of-eight winding comprising a pair of sections, each of the sections having a central bar portion, a first linking bar portion extending angularly in a first direction from a first end of the central bar portion and a second linking bar portion extending in a direction substantially opposite to the first direction from a second end of the central bar portion; said sections being adjacent each other but reversed relative to each other about a line parallel to the central bar portions with the central bar portions positioned to have a substantially common projection on a plane parallel to the figure-of-eight winding, a side bar portion connecting two ends of the linking bar portions on a first side of the central bar portions, and a pair of separate spaced terminals connected respectively to the ends of the linking bar portions on a second side of the central bar portions, one of the linking bar portions being bent adjacent the central bar portion to which it is connected to permit the last-named linking bar portion to move substantially into alignment with a linking bar portion on the opposite side of the central bar portions.

BERNARD E. LENEHAN.

References Cited in the file of this patent

UNITED STATES PATENTS

| Number | Name | Date |
| --- | --- | --- |
| 963,907 | Larzelere | July 12, 1910 |
| 1,376,011 | Frank | Apr. 26, 1921 |
| 1,424,016 | Haworth | July 25, 1922 |
| 1,691,125 | Polydoroff | Nov. 13, 1928 |
| 1,969,499 | Bradshaw | Aug. 7, 1934 |
| 2,177,274 | Barnes | Oct. 24, 1939 |
| 2,349,242 | Barnes | May 23, 1944 |
| 2,374,018 | Johnson | Apr. 17, 1945 |

FOREIGN PATENTS

| Number | Country | Date |
| --- | --- | --- |
| 294,831 | Great Britain | Aug. 2, 1928 |